US009123237B2

(12) United States Patent
Smith et al.

(10) Patent No.: US 9,123,237 B2
(45) Date of Patent: Sep. 1, 2015

(54) CONTROLLING A REMOTE ELECTRONIC DEVICE IN A CONTROL STATE

(75) Inventors: Wallace Eric Smith, Pleasant Grove, WA (US); William B. West, Sandy, UT (US)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 13/196,225

(22) Filed: Aug. 2, 2011

(65) Prior Publication Data

US 2012/0050622 A1 Mar. 1, 2012

Related U.S. Application Data

(60) Provisional application No. 61/370,664, filed on Aug. 4, 2010.

(51) Int. Cl.
*H04N 21/47* (2011.01)
*G08C 23/04* (2006.01)
*G08C 17/02* (2006.01)

(52) U.S. Cl.
CPC ................ *G08C 23/04* (2013.01); *G08C 17/02* (2013.01); *G08C 2201/10* (2013.01); *G08C 2201/50* (2013.01); *G08C 2201/51* (2013.01)

(58) Field of Classification Search
USPC ........... 348/E07.004, E05.103; 713/300, 320, 713/100
See application file for complete search history.

(56) References Cited

U.S. PATENT DOCUMENTS

| | | | | |
|---|---|---|---|---|
| 2002/0036910 | A1 | 3/2002 | Yang | |
| 2006/0155395 | A1 | 7/2006 | Lim | |
| 2008/0266455 | A1 * | 10/2008 | Kim et al. | 348/552 |
| 2009/0303097 | A1 | 12/2009 | Reams et al. | |
| 2010/0009643 | A1 * | 1/2010 | Haartsen | 455/127.5 |
| 2010/0070783 | A1 | 3/2010 | Okamoto et al. | |

OTHER PUBLICATIONS

International Search Report issued for International Patent Application No. PCT/2011/046471 on Dec. 9, 2011.

* cited by examiner

*Primary Examiner* — Jefferey Harold
*Assistant Examiner* — Sihar Karwan
(74) *Attorney, Agent, or Firm* — Austin Rapp & Hardman

(57) ABSTRACT

An electronic device for controlling a remote electronic device is described. The electronic device includes a processor and instructions stored in memory that is in electronic communication with the processor. The electronic device enters a control state that is not a power off state and is not a power on state. The electronic device also generates a control message for a remote electronic device while in the control state. The electronic device further transmits the control message for controlling the remote electronic device while in the control state.

15 Claims, 8 Drawing Sheets

CONTROLLING A REMOTE ELECTRONIC DEVICE IN A CONTROL STATE

RELATED APPLICATIONS

This application is related to and claims priority from U.S. Provisional Patent Application Ser. No. 61/370,664 filed Aug. 4, 2010, for "CONTROLLING REMOTE ELECTRONIC DEVICES IN A CONTROL STATE," which is incorporated herein by reference.

TECHNICAL FIELD

The present disclosure relates generally to electronic devices. More specifically, the present disclosure relates to systems and methods for controlling a remote electronic device in a control state.

BACKGROUND

In recent years, the price of electronic devices has decreased dramatically. In addition, the types of electronic devices that can be purchased have continued to increase. For example, DVD players, large screen TVs, multi-carousel CD and DVD players, MP3 players, video game consoles and similar consumer electronic items have become more widely available while continuing to drop in price.

The decreasing prices and increasing types of electronic components have packed today's homes and businesses with modern conveniences. Typical homes and businesses now include more electronic devices than ever before. While these electronic devices may provide convenience and entertainment, many also require control. Moreover, these electronic devices consume electrical power and may consume other resources. The ever-increasing cost of resources, such as electricity, may be a concern.

It may be inconvenient to manually control and/or monitor the resource consumption of electronic devices. As illustrated by this discussion, improved control of electronic devices and/or the resources they consume may be beneficial.

DETAILED DESCRIPTION

Figure 1:
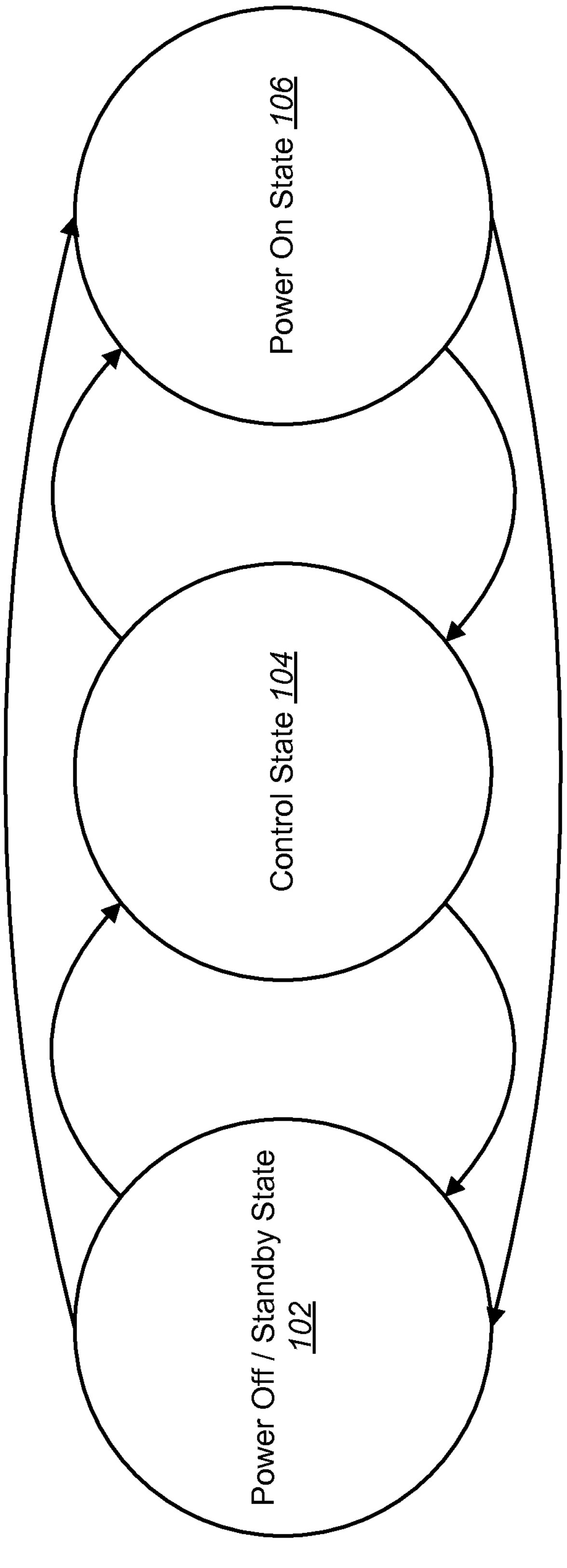
FIG. 1 is a state diagram illustrating several states for an electronic device in which systems and methods for controlling a remote electronic device in a control state may be implemented.

An electronic device for controlling a remote electronic device is disclosed. The electronic device includes a processor and instructions stored in memory that is in electronic communication with the processor. The electronic device enters a control state that is not a power off state and is not a power on state. The electronic device also generates a control message for a remote electronic device while in the control state. The electronic device further transmits the control message for controlling the remote electronic device while in the control state. The electronic device may be an appliance. The electronic device may be a television. The remote electronic device may be an appliance. The control message may be generated based on a control action. The control message may be generated based on remote electronic device information.

The control state may be a reduced power state. The electronic device may not perform a main function while in the control state. The electronic device may only perform operations related to controlling the remote electronic device while in the control state.

A method for controlling a remote electronic device by an electronic device is also disclosed. The method includes entering a control state that is not a power off state and is not a power on state. The method also includes generating a control message for a remote electronic device while in the control state. The method further includes transmitting the control message for controlling the remote electronic device while in the control state.

A non-transitory tangible computer-readable medium for controlling a remote electronic device is also disclosed. The computer-readable medium includes executable instructions for entering a control state that is not a power off state and is not a power on state. The computer-readable medium also includes executable instructions for generating a control message for a remote electronic device while in the control state. The computer-readable medium further includes executable instructions for transmitting the control message for controlling the remote electronic device while in the control state.

Many consumer electronic devices such as televisions and media players may operate in a power off or standby state and a power on state. While in the power on state, a consumer electronic device may perform a main function. For example, a television may use a display or screen to display media when in the power on state. While in the power off or standby state, the consumer electronic device may not use any components or a limited number of components. For example, a television may power an infrared (IR) receiver while in a standby state in order to receive a power on command.

In accordance with the systems and methods disclosed herein, an electronic device (e.g., a consumer electronic device, appliance, etc.) may be used to control one or more remote electronic devices, such as appliances and/or other devices. Electronic devices may be used to perform such control while in a control state that is not a power off or standby state and is not a power on state. In this way, the electronic device may consume less power than if it were in a power on state. Thus, for example, a television may be used to control remote electronic devices while it is not being used for its primary or main function (e.g., displaying media).

As used herein, the term "appliance" and variations thereof may mean a device that has a specific application. A "main function" of an appliance may be the performance of its specific application. For instance, an appliance may be a device that has a specific application and may not be readily reconfigurable or repurposed for another application. Examples of appliances include televisions, videocassette recorders (VCRs), optical media players (e.g., digital video disc (DVD) and Blu-ray players), stereos, home theater systems, ovens, stoves, refrigerators, dish washers, clothes washers, dryers, security systems, thermostats, lighting controls, air conditioners, furnaces, water heaters, pool controls, microwaves, coffee makers, lamps, lights, intercom systems, heaters, coolers, fans, garage door openers, automated gates, compressors, locks, etc. In some configurations, appliances may include electronics that allow control of and/or communication with the appliances. Appliances that include electronics may be a kind of electronic device.

Examples of other devices that may not be appliances may include computers, servers, tablet devices, smart phones, etc., which may not be appliances because they are readily reconfigurable or repurposed and may have a variety of applications. Some devices that may not be appliances, such as computers, servers, tablet devices, smart phones, etc., may have a "main function," such as providing general processing and/or communications functionality.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a state diagram illustrating several states for an electronic device in which systems and methods for controlling a remote electronic device in a control state 104 may be implemented. In FIG. 1, three states are illustrated: a power off or standby state 102, a control state 104 and a power on state 106. An electronic device may function according to the power off state 102, the control state 104 and/or the power on state 106. As illustrated in FIG. 1, the electronic device may transition between states. For example, the electronic device may transition from a power off or standby state 102 to a control state 104 or to a power on state 106. The electronic device may transition from a control state 104 to a power off or standby state 102 or to a power on state 106. Finally, the electronic device may transition from a power on state 106 to a power off or standby state 102 or a control state 104.

Examples of electronic devices that may utilize the systems and methods disclosed herein include televisions, radios, audio receivers, Digital Video Disc (DVD) or Blu-ray players, gaming consoles, desktop computers, laptop computers, tablet devices, netbooks, e-readers, cellular phones, smart phones, Personal Digital Assistants (PDAs), microwave ovens, appliances, etc. While in a power on state 106, an electronic device may perform its typical or main function. For example, an electronic device in a power on state 106 may provide power to components used to perform its main function. For instance, a television may provide power to and operate with a display and speakers while in a power on state 106. Similarly, a Blu-ray player may provide power to and operate with an optical drive and video/audio output components when in a power on state 106. Additionally, a computer, tablet device or smart phone may display an image and provide a user interface while in the power on state 106, for example.

When in a power off or standby state 102, an electronic device may not operate or may operate in a limited fashion. In one configuration, an electronic device may not supply power to any of its components in a power off state 102. In another configuration, an electronic device may operate in a limited fashion while in a power off or standby state 102. For example, a television in a power off or standby state 102 may not supply power to any of its components (e.g., display, speakers, processor, audio/video reception components, etc.) except for one or more wake components (e.g., an IR receiver). More specifically, a power off state 102 may include a "standby" state or mode where an electronic device may supply power to a limited number of components or supply a limited amount of power to its components (that is less than the power on state 106, for example). For example, a television in a power off state 102 may operate in a "standby" mode. While in this standby mode, the television may supply power to an infrared (IR) receiver and may supply enough functionality in order to receive and process a "power on" command from a remote control. Similarly, a game console, smart phone or computer may supply power to a network card, a radio chip and/or a processor to receive messages or data while in a power off or standby state 102. However, while in the power off state 102, a game console may not provide power to audio/video output components, a graphics processor and/or an optical media drive as when in a power on state 106, for instance. For example, a power off or standby state 102 may be characterized by allowing only limited functionality (e.g., state transition, power on or "wake" functionality), supplying power to a limited number of components and/or by supplying limited power to components. Examples of limited functionality includes activating (e.g., powering on) an electronic device.

The control state 104 may be a state of an electronic device that is not a power on state 106 and is not a power off state or standby state 102. For example, the control state 104 may be a reduced power state in comparison to the power on state 106, but may provide control functionality that is unavailable in the power off or standby state 102. While in a control state 104, an electronic device may not perform its main function and/or may not provide power to components used to perform its main function as in a power on state 106. For example, a television may not perform its main function (e.g., receiving and displaying media) or may not provide power to some of its components (e.g., display, speakers, audio/video reception components, etc.) while in a control state 104. Furthermore, an electronic device may provide certain functionality while in a control state 104 that is not provided in a power off state 102. For example, while in a control state 104, an electronic device may control remote electronic devices. For instance, an electronic device may manage resource (e.g., power, other resources or utilities, etc.) consumption of remote electronic devices and/or automate remote electronic devices while in a control state 104. In some configurations, the electronic device may provide processor presence and power to memory, a communications interface and/or a network interface in order to control remote electronic devices while in a control state 104.

The electronic device may transmit control messages to and/or receive messages from remote electronic devices while in the control state 104. Furthermore, an electronic device may determine whether and what control actions for remote electronic devices to perform while in a control state 104. For example, the control state 104 may be characterized by determining control actions and transmitting control messages based on the control actions. As mentioned above, these control actions may be based on control functions such as power consumption management operations, automation operations, communications and/or other operations.

The control state 104 may be distinguished from the power off state 102 or standby mode in several ways. For example, the power off state 102 or standby mode may be characterized by performing no operations or only state transition operations while in the power off or standby state 102. In some configurations, the electronic device may provide power to different components or may provide a different amount of power to components when in a control state 104 versus a power off or standby state 102. For example, a television may provide power to an IR receiver and/or may provide reduced processor presence when in a power off state 102 in order to receive and process an IR "power on" signal. However, the same television may provide comparatively more processor presence (e.g., the processor may perform more functions) when in a control state 104. Furthermore, an electronic device may perform different functions or operations when in a control state 104 as compared to a power off state 102. For example, an electronic device in a power off or standby state 102 may not make any determination regarding the control of remote electronic devices (e.g., power management, automation, etc.) and may not communicate control messages with remote electronic devices in a power off state 102, which it may do in a control state 104.

For example, many devices include mechanisms that are used in a power off or standby mode to wake on data reception from an infrared (IR) signal, network interfaces, mercury switches, accelerometers, temperature sensors and/or a specific time or time interval, etc. However, the control state 104 is a control mode where a control block(s)/module(s) (e.g., implemented in hardware and/or software) may be running in order to manage one or more remote electronic devices. In some configurations, the only functions not running while in a control state 104 are related to the main function of the electronic device. For example, the main function of a television would be to display images, which it does not do in a control state 104. Additionally, the main function of a Blu-Ray player would be to read data from a Blu-Ray disc and/or transmit media information, which it does not do in a control state 104. In some configurations, the only functions performed while in a control state 104 are related to controlling one or more remote electronic devices in addition to state transitioning functions (e.g., powering up, powering down, waking, etc.).

Figure 2:
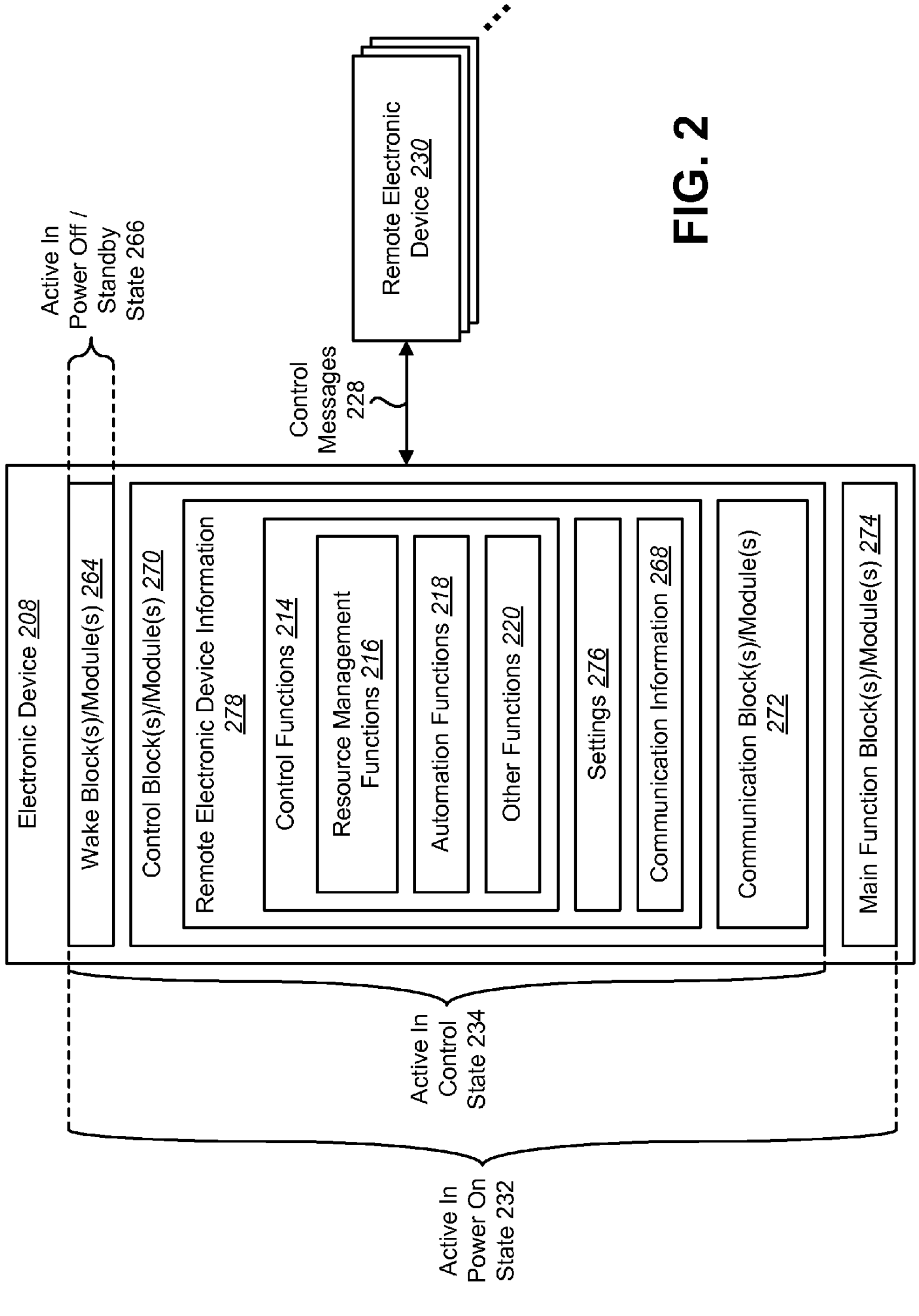
FIG. 2 is a block diagram illustrating one configuration of an electronic device in which systems and methods for controlling a remote electronic device in a control state may be implemented.

FIG. 2 is a block diagram illustrating one configuration of an electronic device 208 in which systems and methods for controlling a remote electronic device 230 in a control state 104 may be implemented. The electronic device 208 may include one or more wake blocks/modules 264, one or more control blocks/modules 270 and one or more main function blocks/modules 274. As used herein, the term "block/module" and variations thereof may indicate that an element may be implemented in hardware, software or a combination of both. For example, the control block(s)/module(s) 270 may be implemented in hardware, software or a combination of both. In some configurations, the electronic device 208 may be an appliance.

The wake block(s)/module(s) 264 may be one or more components used to transition between states 102, 104, 106 on the electronic device 208. For example, the wake block(s)/module(s) 264 may be used to activate the main function block(s)/module(s) 274 to transition from a power off or standby state 102. For example, the wake block(s)/module(s) 264 may include an IR receiver and/or supporting logic that will place the electronic device 208 in a power on state 106 when a signal from a remote control is received. In some configurations, the wake block(s)/module(s) 264 may also activate one or more of the control blocks/modules 270 in order to enter a control state 104. Additionally or alternatively, the wake block(s)/module(s) 264 may be used to deactivate one or more control block(s)/module(s) 270 and/or one or more main function block(s)/module(s) 274.

The wake block(s)/module(s) 264 may be active in the power off or standby state 266. For example, even when the electronic device 208 is turned off or is placed in a standby state 102 (e.g., when not performing its main function), the wake block(s)/module(s) 264 may be still be active in order to provide waking functionality. Furthermore, the wake block (s)/module(s) 264 may be active in a control state 234 and/or active in a power on state 232. In some configurations, the electronic device 208 may provide electrical power to and/or allow functionality from the wake block(s)/module(s) 264 (and not to/from the control block(s)/module(s) 270 and/or not to/from the main function block(s)/module(s) 274, for example) while in the power off or standby state 102.

The control block(s)/module(s) 270 may be one or more hardware and/or software components used to control one or more remote electronic devices 230. The control block(s)/module(s) 270 may be active in a control state 234. As described above, the control state 104 may be a reduced power state where the electronic device 208 may control one or more remote electronic devices 230 while the main function of the electronic device 208 is not provided. For example, the main function block(s)/module(s) 274 may be inactive while in the control state 104. For instance, the electronic device 208 may not provide electrical power to and/or may not allow operation of the main function block(s)/module(s) 274, but may provide electrical power to and/or allow operation of the control block(s)/module(s) 270 while in the control state 104.

The control block(s)/module(s) 270 may include remote electronic device information 278, and/or communication block(s)/module(s) 272. The communication block(s)/module(s) 272 may comprise one or more components used by the electronic device 208 to communicate with other electronic devices. For example, the communication block(s)/module (s) 272 may include a Universal Serial Bus (USB) port, a High-Definition Multimedia Interface (HDMI) port, an IR receiver/transmitter and/or an Institute of Electrical and Electronics Engineers (IEEE) 1394 port, etc. Additionally or alternatively, the communication block(s)/module(s) 272 may comprise one or more components used by the electronic device 208 to communicate with other electronic devices over a network. For example, the communication block(s)/module (s) 272 may include an Ethernet port, IEEE 802.11 ("Wi-Fi") transceiver, Bluetooth transceiver, USB port, wireless modem, etc.

The main function block(s)/module(s) 274 may comprise one or more hardware and/or software components used by the electronic device 208 to perform its main function. For example, the main function block(s)/module(s) 274 of a television may include a display (e.g., Liquid Crystal Display (LCD) panel, Light Emitting Diode (LED) screen, etc.), one or more speakers, etc. In another example, the main function block(s)/module(s) 274 of a DVD or Blu-ray player may include an optical media drive, one or more video outputs and one or more audio outputs. In another example, the main function block(s)/module(s) 274 of a tablet device or smart phone may be a touchscreen display, audio output jack, speaker and/or general purpose processing (for any application besides remote electronic device 230 control, for example). The main function block(s)/module(s) 274 of a desktop computer may be a video port, user input block (for any input besides a waking input, for example) and/or general purpose processing (for any application besides remote electronic device 230 control, for example).

The electronic device 208 may communicate with one or more remote electronic devices 230. Examples of remote electronic devices 230 include appliances (e.g., refrigerators, dishwashers, washing machines, dryers, air conditioning units, furnaces, pool equipment, sprinkling system controllers, thermostats, lighting controllers, security systems, audio systems, entertainment systems, telephone systems, etc.) and other devices.

When the electronic device 208 is in a power on state 106, many (if not all) of its components may be active. For example, the wake block(s)/module(s) 264, control block(s)/module(s) 270 and main function block(s)/module(s) 274 may be active while the electronic device 208 is in a power on state 232. For example, while in a power on state 232, a television may use the main function block(s)/module(s) 274 to process video and/or audio, to display an image, to receive video and audio signals and/or to receive Internet data to perform its main function, which is to display media.

When the electronic device 208 is in a control state 104, fewer and/or different components may be active. For example, the control block(s)/module(s) 270 may be active while the electronic device 208 is in a control state 234, while one or more main function block(s)/module(s) 274 may not be active. For example, when a television (an electronic device 208) is in a control state 104, its display, video/audio processing and/or media transmission/reception (e.g., main function block(s)/module(s) 274) may be inactive. In another example, when a DVD or Blu-ray player in is a control state 104, its optical media drive, video output(s), audio output(s) and/or media transmission/reception (e.g., main function block(s)/module(s) 274) may be inactive. In yet another example, when a tablet device or smart phone is in a control state, its general purpose processing (besides processing for controlling remote electronic device(s) 230) and/or touch-screen display (e.g., main function block(s)/module(s) 274) may be inactive. In yet another example, when a desktop or laptop computer is in a control state, its general purpose processing (besides processing for controlling remote electronic device(s) 230) (e.g., its main function block(s)/module (s) 274) may be inactive.

The electronic device 208 may function differently when in a control state 104 than when in a power on state 106. In one configuration, for example, the electronic device 208 may be incapable of performing any other operation besides operations related to controlling the remote electronic device(s) 230 and/or transitioning states (e.g., transitioning to the power off or standby state 102 and/or transitioning to the power on state 106). For instance, a television may be incapable of displaying media or performing other operations besides controlling the remote electronic device(s) 230 and/or transitioning states (e.g., being turned on) while in the control state 104. With the exception of state transition functionality, for example, a computer, smart phone and/or tablet device may not perform processing unrelated to controlling the remote electronic device(s) 230 while in the control state 104. This approach may help to reduce power consumption while the electronic device 208 is in the control state 104.

The electronic device 208 functions differently when in a control state 104 than when in a power off or standby state 102. While in a power off or standby state 102, the electronic device 208 may provide state transitioning functionality. For example, the electronic device 208 may perform operations related to transitioning to the control state 104 or to the power on state 106 while in the power off or standby state 102. In some configurations, the electronic device 208 may not allow other operations that are unrelated to state transitioning while in the power off or standby state 102.

When in a control state 104, the electronic device 208 may perform control operations (for remote electronic device(s) 230) which may not be done when in the power off or standby state 102. For example, the electronic device 208 may determine control actions, generate control messages 228 and/or communicate with remote electronic device(s) 230, which it 208 may not do when in a power off or standby state 102. In some configurations, the electronic device 208 may only provide functionality related to controlling remote electronic device(s) 230 and transitioning states while in a control state 104.

In some configurations, the electronic device 208 may have other states that are not the control state 104, the power off or standby state 102 or the power on state 106. For example, a television may have a separate guide update state where the television receives information to populate a media guide although the television is not displaying any media. In another example, a computer or game console may have a download state where data is received although it is not providing a user interface or displaying media. In yet another example, a smart phone may communicate with a base station while not providing a phone call, web browsing or a user interface. However, these kinds of states may be different from the control state 104 in that the control state 104 provides for control of remote electronic device(s) 230. In some configurations, only control operations may be performed while the electronic device 208 is in the control state 104 (with the exception of state transitioning functionality).

While in a control state 104, the electronic device 208 may utilize the control block(s)/module(s) 270. In some configurations, the electronic device 208 may also utilize the control block(s)/module(s) 270 while in a power on state 106. As described above, the control block(s)/module(s) 270 may include remote electronic device information 278. The remote electronic device information 278 may include control functions 214, settings 276 and/or communication information 268. Examples of control functions 214 include resource management functions 216, automation functions 218 and other functions 220. In some configurations, the control block(s)/module(s) 270 and/or one or more of the included elements 264, 214, 276, 268, 272 may comprise an embedded device in the electronic device 208 (e.g., appliance). For instance, the control block(s)/module(s) 270 may comprise one or more embedded hardware components (e.g., integrated circuitry) and/or one or more embedded software components included within the electronic device 208 (e.g., appliance). In some configurations, the control block(s)/module(s) 270 may be unrelated to the main function block(s)/module(s) 274 in the electronic device 208 (e.g., appliance).

Resource management functions 216 may be functions used to manage resources, such as electrical power consumption of the one or more remote electronic devices 230 (or other devices controlled by the one or more remote electronic devices 230), for example. The resource management functions 216 may also be used to control the consumption of other resources, such as water, fuel and communication resources. For instance, the resource management functions 216 may control the energy or utility consumption of one or more furnaces, air conditioners, water heaters, lighting systems, televisions, computers and/or media devices (e.g., DVD or Blu-ray player, game console, projector, audio system, etc.), etc.

The automation functions 218 may be functions used to automate one or more remote electronic devices 230. For example, the automation functions 218 may be used to turn lights on or off at specific times, to schedule activation/deactivation of a security system, to schedule temperature settings (via a thermostat, for example), to schedule water heater activation/deactivation, to schedule a sprinkling system, to automate entertainment or media (e.g., to turn a television on and dim the lights at a particular time, etc.), etc. Other functions 220 may additionally or alternatively be performed by the electronic device 208.

The settings 276 may be used to determine the behavior of the control functions 214. More specifically, the settings 276 may provide one or more parameters or variables to be used according to the control functions 214. For example, settings 276 may indicate one or more time ranges, limits, thresholds, frequencies, schedules, triggers, targets, etc., for controlling the remote electronic device(s) 230. For instance, the settings 276 may include a schedule(s) for operating lights, controlling a thermostat, operating a sprinkling system, activating a security system, operating a washing machine and/or turning off an oven. In another example, the settings 276 may indicate a target and/or limit for resource (e.g., electricity, gas, water, etc.) consumption. The settings 276 may be adjustable (automatically and/or by a user, for example).

When the electronic device 208 is in a control state 104, it 208 may determine one or more control actions. For example, the electronic device 208 may determine one or more control actions based on the remote electronic device information 278 (e.g., control functions 214 and/or settings 276). For instance, an automation function 218 may allow a dishwasher to be started at a time provided by the settings 276. The electronic device 208 (e.g., control block(s)/module(s) 270) may determine a control action to start the dishwasher.

The electronic device 208 (e.g., control block(s)/module(s) 270) may generate one or more control messages 228 to send to one or more remote electronic devices 230. These control messages 228 may be generated and/or transmitted based on the remote electronic device information 278 (e.g., one or more control functions 214, one or more settings 276 and/or communication information 268) and/or messages received from the one or more remote electronic devices 230. For example, the electronic device 208 may monitor the power consumption of an air conditioning unit (a remote electronic device 230) using messages received from the air conditioning unit and generate and send a control message 228 to a thermostat (another remote electronic device 230) using a resource management function 216 while in a control state 104. More specifically, a resource management function 216 may dictate that a thermostat temperature should be raised by two degrees if the power consumption of the air conditioning unit crosses a threshold. A command to raise the thermostat may be sent to the thermostat using a control message 228. The control messages 228 may control the one or more remote electronic devices 230. For example, the control messages 228 may cause remote electronic device(s) 230 (e.g., appliance(s)) to perform an operation related to their main function(s). In some configurations, the control messages 228 may not be only be related to the mere exchange of data (e.g., the control messages 228 may not be data requests in some configurations or instances), but may be commands related to a specific application (e.g., turning on lights, turning off an oven, igniting a furnace, starting a sprinkling system, playing music, closing a gate, locking doors, etc.).

In some configurations, generating and/or transmitting the control message(s) 228 may be based on the communication information 268. The communication information 268 may provide one or more communication formats to allow the electronic device 208 to communicate with (e.g., transmit information to and/or receive and/or interpret information from) the one or more remote electronic devices 230. For example, the communication information 268 may prescribe a communication format that allows a remote electronic device 230 to receive and/or follow a transmitted control message 228. In some cases, different remote electronic devices 230 may use different protocols and/or different encodings for control messages 228. For instance, a lighting controller may use Zigbee protocols, while a refrigerator may use Ethernet protocols. Furthermore, each remote electronic device 230 may use certain action codes or commands for control messages. Thus, control messages 228 may be formatted based on the communication information 268 in some configurations. In some configurations, the control messages 228 may comprise any command that is executable by the remote electronic device(s) 230.

Figure 3:
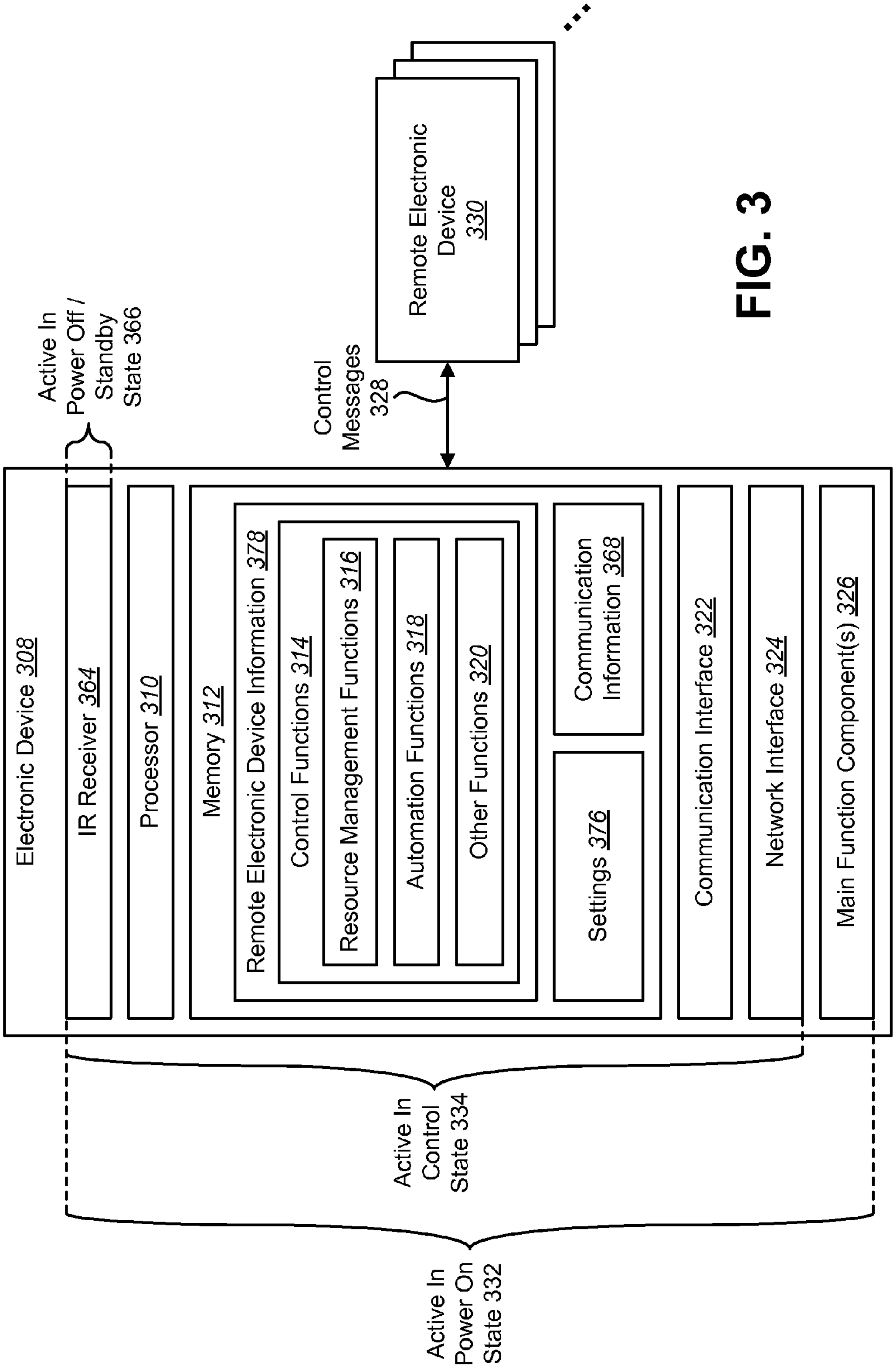
FIG. 3 is a block diagram illustrating a more specific configuration of an electronic device in which systems and methods for controlling a remote electronic device in a control state may be implemented.

FIG. 3 is a block diagram illustrating a more specific configuration of an electronic device 308 in which systems and methods for controlling a remote electronic device 330 in a control state 104 may be implemented. The electronic device 308 may include an IR receiver 364, processor 310, memory 312, a communication interface 322, a network interface 324 and/or one or more main function components 326. In some configurations, the electronic device 308 may be an appliance. One example of the electronic device 308 is a television.

The IR receiver 364 may be active in the power off or standby state 366. For example, even when the electronic device 308 is turned off or is placed in a standby state (e.g., when not performing its main function), the IR receiver 364 may be still be active in order to provide waking functionality. Furthermore, the IR receiver 364 may be active in a control state 334 and/or active in a power on state 332. It should be noted that the electronic device 308 may provide electrical power to the IR receiver 364 while in the power off or standby state 102. The IR receiver 364 may be one example of the wake block(s)/module(s) 264 illustrated in FIG. 2.

The processor 310 may execute instructions or code (e.g., functions) stored in memory 312. The processor 310 may generally be used for electronic device 308 functionality. For example, a processor 310 in a television may be used for scaling video images, interpolating video images (e.g., between pixels or between frames, etc.) and other functions.

The memory 312 may include instructions (e.g., code). For example, the memory 312 may include instructions or code for the main function of the electronic device 308. The memory 312 may additionally or alternatively include remote electronic device information 378, including control functions 314, such as resource management functions 316, automation functions 318 and/or other functions 320. In some configurations, the memory 312 may include settings 376 and/or communication information 368.

The communication interface 322 may comprise one or more components used by the electronic device 308 to communicate with other electronic devices. For example, the communication interface 322 may include a Universal Serial Bus (USB) port, a High-Definition Multimedia Interface (HDMI) port, an IR receiver/transmitter (that may be the same as or different from the IR receiver 364) and/or an Institute of Electrical and Electronics Engineers (IEEE) 1394 port, an antenna port, etc.

Additionally or alternatively, the electronic device 308 may include a network interface 324 that comprises one or more components used by the electronic device 308 to communicate with other electronic devices over a network. For example, the network interface 324 may include an Ethernet port, IEEE 802.11 ("Wi-Fi") chip, USB port, wireless modem, etc. The communication interface 322 and the network interface 324 may be examples of the communication block(s)/module(s) 272 illustrated in FIG. 2.

The main function components 326 may comprise one or more components used by the electronic device 308 to perform its main or primary function. For example, the main function components 326 of a television may include a display (e.g., Liquid Crystal Display (LCD) panel, Light Emitting Diode (LED) screen, etc.), one or more speakers, etc. It should be noted that one or more other components besides the main function component(s) 326 may be used to perform the electronic device's 308 main function. For example, a television may use a processor 310 in addition to a display.

The electronic device 308 may communicate with one or more remote electronic devices 330. Examples of remote electronic devices 330 include appliances (e.g., refrigerators, dishwashers, washing machines, dryers, air conditioning units, furnaces, pool equipment, sprinkling system controllers, thermostats, lighting controllers, security systems, audio systems, entertainment systems, telephone systems, etc.) and other devices. In some configurations, all of the remote electronic devices 330 may be included in and/or may be attached to and/or associated with a single structure (e.g., house, building, etc.). For example, all of the remote electronic devices 330 may be appliances and controllers included within, attached to and/or associated with a house.

When the electronic device 308 is in a power on state 106, many (if not all) of its components may be active. For example, the IR receiver 364, processor 310, memory 312, communications interface 322, network interface 324 and main function components 326 may be active while the electronic device 308 is in a power on state 332. For example, while in a power on state 332, a television may use the processor 310 to execute instructions included in memory 312 (e.g., instructions for a main function), may use a communication interface 322 to receive video and audio signals, may use a network interface 324 to receive Internet data and may use main function components 326 such as a display to perform its primary main function (e.g., displaying media). Furthermore, the IR receiver 364 may be active while in the power on state 332 in order to allow the electronic device 308 to transition to the power off or standby state 102.

When the electronic device 308 is in a control state 104, fewer and/or different components may be active (as compared to the power on state 106, for instance). For example, the processor 310, memory 312, the communications interface 322 and/or the network interface 324 may be active while the electronic device 308 is in a control state 334, while one or more main function components 326 may not be active. For example, when a television (an electronic device 308) is in a control state 104, its display (a main function component 326) may not be active. In some configurations, only components and/or procedures provided by the processor 310, memory 312, communication interface 322 and/or network interface 324 that are related to controlling the remote electronic device (s) 330 (and state transitioning, for example) may be used while the electronic device 308 is in a control state 104.

In some configurations, when the electronic device 308 is in a control state 104, one or more components in the electronic device 308 may function differently than when the electronic device 308 is in a power on state 106. In one configuration, for example, the processor 310 may operate slower and/or at a reduced processor presence (e.g., performing fewer operations) when the electronic device 308 is in a control state 104; the memory 312 may operate slower, at a reduced power and/or only use certain portions of memory 312 when in a control state 104; the communications interface 322 may operate at a reduced power and/or only use certain components (e.g., ports) or communication speeds; the network interface 324 may operate differently when in a control state 104, only communicating with certain electronic devices (e.g., remote electronic devices 330), operating at reduced speed and/or reduced power, etc. In some configurations, all of the components except the main function components 326 may be "fully awake" (e.g., using their typical amount of power/resources etc.) when in a control state 104.

In some configurations, however, only components and/or procedures provided by the electronic device 308 that are related to controlling the one or more remote electronic devices 330 may be used while in a control state 104 (in addition to state transitioning functionality). For example, the processor 310 may only execute instructions related to controlling a remote electronic device 330 while in the control state 104. Furthermore, the memory 312 may only be used for accessing data related to controlling a remote electronic device 330 while in the control state 104. Also, the communication interface 322 and/or network interface 324 may only provide communications related to controlling a remote electronic device 330 while in the control state 104.

While in the power off or standby state 102, the electronic device 308 may provide state transition functionality (e.g., waking functionality). For example, the IR receiver 364 may be active in the power off or standby state 366 in order to allow the electronic device 308 to transition to a power on state 106 when a command is received. In some configurations, the processor 310 and/or a portion of the memory 312 may also be active while in the power off or standby state 366. However, any components that are active in the power off or standby state 366 may only provide state transition functionality, for example. In some configurations, one or more components that are active in the power off or standby state 366 may additionally or alternatively allow the electronic device 308 to transition to the control state 104.

Some of the electronic device 308 components 310, 312, 322, 324 may additionally or alternatively function differently when in a control state 104 than when in a power off or standby state 102. For example, the electronic device 308 may perform different or additional functions, may use different components and/or may supply a different amount of power to certain components when in a control state 104 than when in a power off state 102 or standby mode. For example, the electronic device 308 may allocate more processor 310 presence, determine control actions, produce control messages 328 and/or communicate with certain remote electronic devices 330, which it 308 may not do when in a power off or standby state 102. In some configurations, for example, only an IR receiver 364 may be active when the electronic device 308 is in a power off or standby mode 366 in order to receive a power on command. However, in some configurations, additional blocks/modules may be active in a control state 104 when compared to a power off or standby state 102.

When the electronic device 308 is in a control state 104, the electronic device 308 may control the one or more remote electronic devices 330. For example, while the electronic device 308 is in a control state 104, the processor 310 may perform one or more control functions 314. The control functions 314 may be stored in memory 312 and may include resource management functions 316, automation functions 318 and/or other functions 320. Additionally or alternatively, the memory 312 may include settings 376 and/or communication information 368.

Resource management functions 316 may be functions used to manage resources, such as electrical power consumption of the remote electronic devices 330 (or other devices controlled by the remote electronic devices 330), for example. The resource management functions 316 may also be used to control the consumption of other resources, such as water, fuel and communication resources. For instance, the resource management functions 316 may control the energy or utility consumption of one or more furnaces, air conditioners, water heaters, lighting systems, televisions, computers and/or media devices (e.g., DVD or Blu-ray player, game console, projector, audio system, etc.), etc.

The automation functions 318 may be functions used to automate one or more remote electronic devices 330. For example, the automation functions 318 may be used to turn lights on or off at specific times, to schedule activation/deactivation of a security system, to schedule temperature settings (via a thermostat, for example), to schedule water heater activation/deactivation, to automate entertainment or media (e.g., to turn a television on and dim the lights at a particular time, etc.), etc. Other functions 320 may additionally or alternatively be performed by the electronic device 308.

The settings 376 may be used to determine the behavior of the control functions 314. More specifically, the settings 376 may provide one or more parameters or variables to be used according to the control functions 314. For example, settings 376 may indicate one or more time ranges, limits, thresholds, frequencies, schedules, triggers, targets, etc., for controlling the remote electronic device(s) 330. For instance, the settings 376 may include schedule(s) for operating lights, controlling a thermostat, operating a sprinkling system, activating a security system, operating a washing machine and/or turning off an oven. In another example, the settings 376 may indicate a target and/or limit for resource (e.g., electricity, gas, water, etc.) consumption. The settings 376 may be adjustable (automatically and/or by a user, for example).

When the electronic device 308 is in a control state 104, it 308 may determine one or more control actions. For example, the electronic device 308 may determine one or more control actions based on the control functions 314 and/or the settings 376. The electronic device 308 may generate one or more control messages 328 to send to one or more remote electronic devices 330. These control messages 328 may be generated and/or sent based on the control functions 314 and/or messages received from the one or more remote electronic devices 330. For example, the electronic device 308 may monitor the power consumption of an air conditioning unit (a remote electronic device 330) using messages received from the air conditioning unit and generate and send a control message 328 to a thermostat (another remote electronic device 330) using a resource management function 316 while in a control state 104. More specifically, a resource management function 316 may dictate that a thermostat temperature should be raised by two degrees if the power consumption of the air conditioning unit crosses a threshold. A command to raise the thermostat may be sent to the thermostat using a control message 328.

In some configurations, generating and/or transmitting the control message(s) 328 may be based on the communication information 368. The communication information 368 may provide one or more communication formats to allow the electronic device 308 to communicate with the one or more remote electronic devices 330. For example, the communication information 368 may prescribe a communication format that allows a remote electronic device 330 to receive and/or follow a transmitted control message 328. In some cases, different remote electronic devices 330 may use different protocols and/or different encodings for control messages 328. For instance, a lighting controller may use Zigbee protocols, while a refrigerator may use Ethernet protocols. Furthermore, each remote electronic device 330 may use certain action codes or commands for control messages. Thus, control messages 328 may be formatted based on the communication information 368 in some configurations. In some configurations, the control messages 328 may comprise any command that is executable by the remote electronic device(s) 330.

Figure 4:
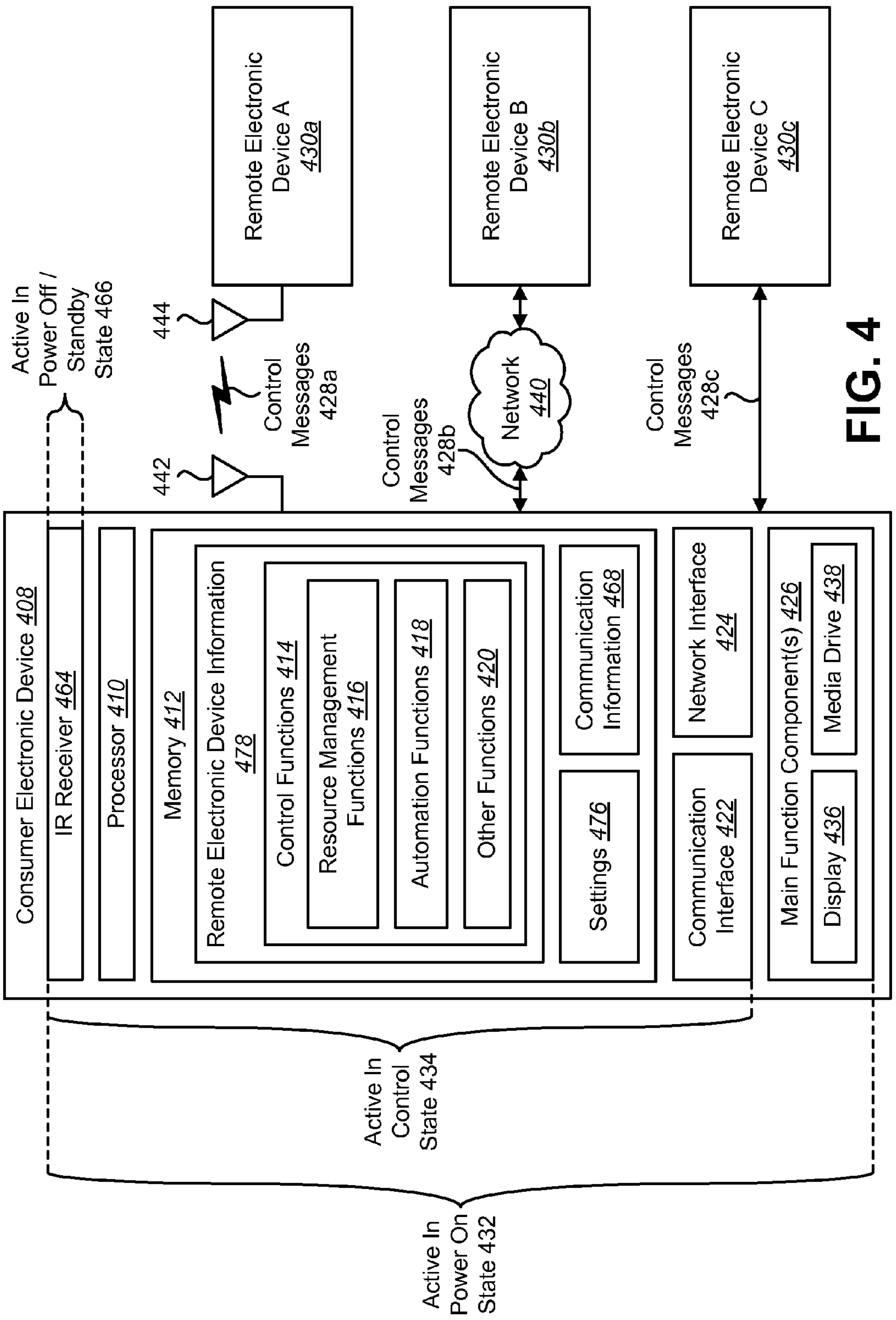
FIG. 4 is a block diagram illustrating one configuration of a consumer electronic device in which systems and methods for controlling a remote electronic device in a control state may be implemented.

FIG. 4 is a block diagram illustrating one configuration of a consumer electronic device 408 in which systems and methods for controlling a remote electronic device 430*a-c* in a control state 104 may be implemented. Examples of consumer electronic devices 408 include televisions, desktop computers, laptop computers, tablet devices, game consoles, audio players (e.g., Compact Disc (CD) players, digital audio players, iPods, etc.), video players (e.g., DVD players, Blu-ray players, Digital Video Recorders (DVRs), iPods, etc.), cellular phones, smart phones, Personal Digital Assistants (PDAs), e-readers, multifunction devices (e.g., printers/scanners), etc. The consumer electronic device 408 may include an IR receiver 464, processor 410, memory 412, a communication interface 422, a network interface 424, main function component(s) 426 and/or one or more antennas 442. In some configurations, the consumer electronic device 408 may be an appliance (e.g., television).

The IR receiver 464 may be active in the power off or standby state 466. For example, even when the consumer electronic device 408 is turned off or is placed in a standby state (e.g., when not performing its main function), the IR receiver 464 may be still be active in order to provide waking functionality. Furthermore, the IR receiver 464 may be active in a control state 434 and/or active in a power on state 432. It should be noted that the consumer electronic device 408 may provide electrical power to the IR receiver 464 while in the power off or standby state 102. The IR receiver 464 may be one example of the wake block(s)/module(s) 264 illustrated in FIG. 2.

The processor 410 may execute instructions or code (e.g., functions) stored in memory 412. The processor 410 may generally be used for consumer electronic device 408 functionality. For example, a processor 410 in a television may be used for scaling video images, interpolating video images (e.g., between pixels or between frames, etc.) and other functions.

The memory 412 may include instructions (e.g., code). For example, the memory 412 may include instructions or code for the primary or main function of the consumer electronic device 408. The memory 412 may additionally or alternatively include remote electronic device information 478, including control functions 414, such as resource management functions 416, automation functions 418 and/or other functions 420. In some configurations, the memory 412 may include settings 476 and/or communication information 468.

The communication interface 422 may comprise one or more components used by the consumer electronic device 408 to communicate with other electronic devices. For example, the communication interface 422 may include one or more USB ports, HDMI ports, IR receivers/transmitters (that may be the same as or different from the IR receiver 464), audio ports, composite video ports, component video ports, IEEE 1394 ports and/or SD card readers, etc.

Additionally or alternatively, the consumer electronic device 408 may include a network interface 424 that comprises one or more components used by the consumer electronic device 408 to communicate with other electronic devices over a network 440. For example, the network interface 424 may include an Ethernet port, IEEE 802.11 ("Wi-Fi") chip, USB port, wireless modem, etc.

The main function components 426 may comprise one or more components used by the consumer electronic device 408 to perform its main or primary function. For example, the main function components 426 of a television may include a display 436 (e.g., Liquid Crystal Display (LCD) panel, Light Emitting Diode (LED) screen, etc.), one or more speakers, etc. It should be noted that one or more other components besides the main function component(s) 426 may be used to perform the electronic device's 408 main function in some configurations. The main function components 426 of a video player (e.g., Blu-ray player, DVD player, etc.) may comprise an optical media drive 438.

The consumer electronic device 408 may communicate with one or more remote electronic devices 430*a-c*. For example, the consumer electronic device 408 may wirelessly communicate with remote electronic device A 430*a*. More specifically, the consumer electronic device 408 may transmit and/or receive electromagnetic signals using one or more antennas 442. Remote electronic device A 430*a* may also transmit and/or receive electromagnetic signals using one or more antennas 444. For instance, the consumer electronic device 408 may wirelessly send control messages 428*a* using an antenna 442, which remote electronic device A 430*a* may receive using an antenna 444.

The consumer electronic device 408 may also communicate with remote electronic device B 430*b* over a network 440. Examples of the network 440 include Local Area Networks (LANs), Wide Area Networks (WANs), the Internet, wireless networks, wired networks and/or any combination of the foregoing. The consumer electronic device 408 may send control messages 428*b* to remote electronic device B 430*b* using the network 440.

The consumer electronic device 408 may additionally or alternatively communicate with remote electronic device C 430*c* using a wired connection. The wired connection may be used by the consumer electronic device 408 to send control messages 428*c* to remote electronic device C 430*c*. Examples of remote electronic devices 430*a-c* include appliances (e.g., refrigerators, dishwashers, washing machines, dryers, air conditioning units, furnaces, pool equipment, sprinkling system controllers, thermostats, lighting controllers, security systems, audio systems, entertainment systems, telephone systems, etc.) and other devices. In some configurations, all of the remote electronic devices 430*a-c* may be included in and/or may be attached to a single structure (e.g., house, building, etc.). For example, all of the remote electronic devices 430*a-c* may be appliances and controllers included within attached to, and/or associated with a house.

When the consumer electronic device 408 is in a power on state 106, many (if not all) of its components may be active. For example, the IR receiver 464, the processor 410, memory 412, communications interface 422, network interface 424 and main function components 426 may be active while the consumer electronic device 408 is in a power on state 432. For example, while in a power on state 432, a television may use the processor 410 to execute instructions included in memory 412 (e.g., instructions for primary or main functions), may use a communication interface 422 to receive video and audio signals, may use a network interface 424 to receive Internet data and may use main function components 426, such as a display 436 to perform its primary main function (e.g., displaying media). Furthermore, for example, the optical media drive 438 may be active in the power on state 432 when a Blu-ray player (a consumer electronic device 408) is in a power on state 106.

When the consumer electronic device 408 is in a control state 104, fewer and/or different components may be active. For example, the processor 410, memory 412, the communications interface 422 and/or the network interface 424 may be active while the consumer electronic device 408 is in a control state 434, while one or more main function components 426 may not be active. For example, when a television (a consumer electronic device 408) is in a control state 104, its display 436 may not be active. Furthermore, for example, video ports (e.g., HDMI, composite, component, etc.) in the communication interface 422 on a television may not be active while the television is in a control state 104.

In some configurations, when the consumer electronic device 408 is in a control state 104, one or more components in the consumer electronic device 408 may function differently than when the consumer electronic device 408 is in a power on state 106. For example, the processor 410 may operate slower and/or with a reduced presence when the consumer electronic device 408 is in a control state 104; the memory 412 may operate slower, at a reduced power and/or only use certain portions of memory 412 when in a control state 104; the communications interface 422 may operate at a reduced power and/or only use certain components (e.g., ports) or communication speeds; the network interface 424 may operate differently when in a control state 104, only communicating with certain electronic devices (e.g., remote electronic devices 430*a-c*), operating at reduced speed and/or reduced power, etc. In other configurations, all of the components except the main function components 426 may be "fully awake" (e.g., using their typical amount of power/resources etc.) when in a control state 104.

In some configurations, however, only components and/or procedures provided by the consumer electronic device 408 that are related to controlling the one or more remote electronic devices 430 may be used while in a control state 104 (in addition to state transitioning functionality). For example, the processor 410 may only execute instructions related to controlling a remote electronic device 430 while in the control state 104. Furthermore, the memory 412 may only be used for accessing data related to controlling a remote electronic device 430 while in the control state 104. Also, the communication interface 422 and/or network interface 424 may only provide communications related to controlling a remote electronic device 430 while in the control state 104.

While in the power off or standby state 102, the consumer electronic device 408 may provide state transition functionality (e.g., waking functionality). For example, the IR receiver 464 may be active in the power off or standby state 466 in order to allow the consumer electronic device 408 to transition to a power on state 104 when a command is received. In some configurations, the processor 410 and/or a portion of the memory 412 may also be active while in the power off or standby state 466. However, any components that are active in the power off or standby state 466 may only provide state transition functionality, for example. In some configurations, one or more components that are active in the power off or standby state 466 may additionally or alternatively allow the consumer electronic device 408 to transition to the control state 104.

Some of the consumer electronic device 408 components 410, 412, 422, 424 may additionally or alternatively function differently when in a control state 104 than when in a power off state 102 or standby mode. For example, the consumer electronic device 408 may perform different or additional functions, may use different components and/or may supply a different amount of power to certain components when in a control state 104 than when in a power off or standby state 102. For example, the consumer electronic device 408 may allocate more processor 410 presence, determine control actions, produce control messages 428*a-c* and/or communicate with certain remote electronic devices 430*a-c*, which it 408 may not do when in a power off or standby state 102. In some configurations, for example, only an IR receiver 464 may be active when the electronic device 208 is in a power off or standby mode 466 in order to receive a power on command. However, in some configurations, additional blocks/modules may be active in a control state 104 when compared to a power off or standby state 102.

When the consumer electronic device 408 is in a control state 104, the consumer electronic device 408 may control the one or more remote electronic devices 430*a-c*. For example, while the consumer electronic device 408 is in a control state 104, the processor 410 may perform one or more control functions 414. The control functions 414 may be stored in memory 412 and may include resource management functions 416, automation functions 418 and/or other functions 420.

Resource management functions 416 may be functions used to manage resources, such as electrical power consumption of the remote electronic devices 430*a-c* (or other devices controlled by the remote electronic devices 430), for example. The resource management functions 416 may also be used to control the consumption of other resources, such as water, fuel and communication resources. For instance, the resource management functions 416 may control the energy or utility consumption of one or more furnaces, air conditioners, water heaters, lighting systems, televisions, computers and/or media devices (e.g., DVD or Blu-ray player, game console, projector, audio system, etc.), etc.

The automation functions 418 may be functions used to automate one or more remote electronic devices 430*a-c*. For example, the automation functions 418 may be used to turn lights on or off at specific times, to schedule activation/deactivation of a security system, to schedule temperature settings (via a thermostat, for example), to schedule water heater activation/deactivation, to automate entertainment or media (e.g., to turn a television on and dim the lights at a particular time, etc.), etc. Other functions 420 may additionally or alternatively be performed by the consumer electronic device 408. For example, the consumer electronic device 408 may send a text message to a particular phone number indicating that motion (using a motion sensor (a remote electronic device 430)) has been detected in the backyard while a user is on vacation or that a furnace is consuming more energy than a pre-set threshold.

The settings 476 may be used to determine the behavior of the control functions 414. More specifically, the settings 476 may provide one or more parameters or variables to be used according to the control functions 414. For example, settings 476 may indicate one or more time ranges, limits, thresholds, frequencies, schedules, triggers, targets, etc., for controlling the remote electronic device(s) 430. For instance, the settings 476 may include schedule(s) for operating lights, controlling a thermostat, operating a sprinkling system, activating a security system, operating a washing machine and/or turning off an oven. In another example, the settings 476 may indicate a target and/or limit for resource (e.g., electricity, gas, water, etc.) consumption. The settings 476 may be adjustable (automatically and/or by a user, for example).

When the consumer electronic device 408 is in a control state 104, it 408 may determine one or more control actions. For example, the consumer electronic device 408 may determine one or more control actions based on the control functions 414 and/or the setting 476. The consumer electronic device 408 may generate one or more control messages 428*a-c* to send to one or more remote electronic devices 430*a-c*. These control messages 428 may be generated and/or sent based on the control functions 414 and/or messages received from the one or more remote electronic devices 430*a-c*. For example, the consumer electronic device 408 may monitor the power consumption of an air conditioning unit (a remote electronic device 430) using messages received from the air conditioning unit and generate and send a control message 428 to a thermostat (another remote electronic device 430) using a resource management function 416 while in a control state 104. More specifically, a resource management function 416 may dictate that a thermostat temperature should be raised by two degrees if the power consumption of the air conditioning unit crosses a threshold. A command to raise the thermostat may be sent to the thermostat using a control message 428.

In some configurations, generating and/or transmitting the control message(s) 428 may be based on the communication information 468. The communication information 468 may provide one or more communication formats to allow the consumer electronic device 408 to communicate with the one or more remote electronic devices 430. For example, the communication information 468 may prescribe a communication format that allows a remote electronic device 430 to receive and/or follow a transmitted control message 428. In some cases, different remote electronic devices 430 may use different protocols and/or different encodings for control messages 428. For instance, a lighting controller may use Zigbee protocols, while a refrigerator may use Ethernet protocols. Furthermore, each remote electronic device 430 may use certain action codes or commands for control messages. Thus, control messages 428 may be formatted based on the communication information 468 in some configurations. In some configurations, the control messages 428 may comprise any command that is executable by the remote electronic devices 430*a-c*.

Figure 5:
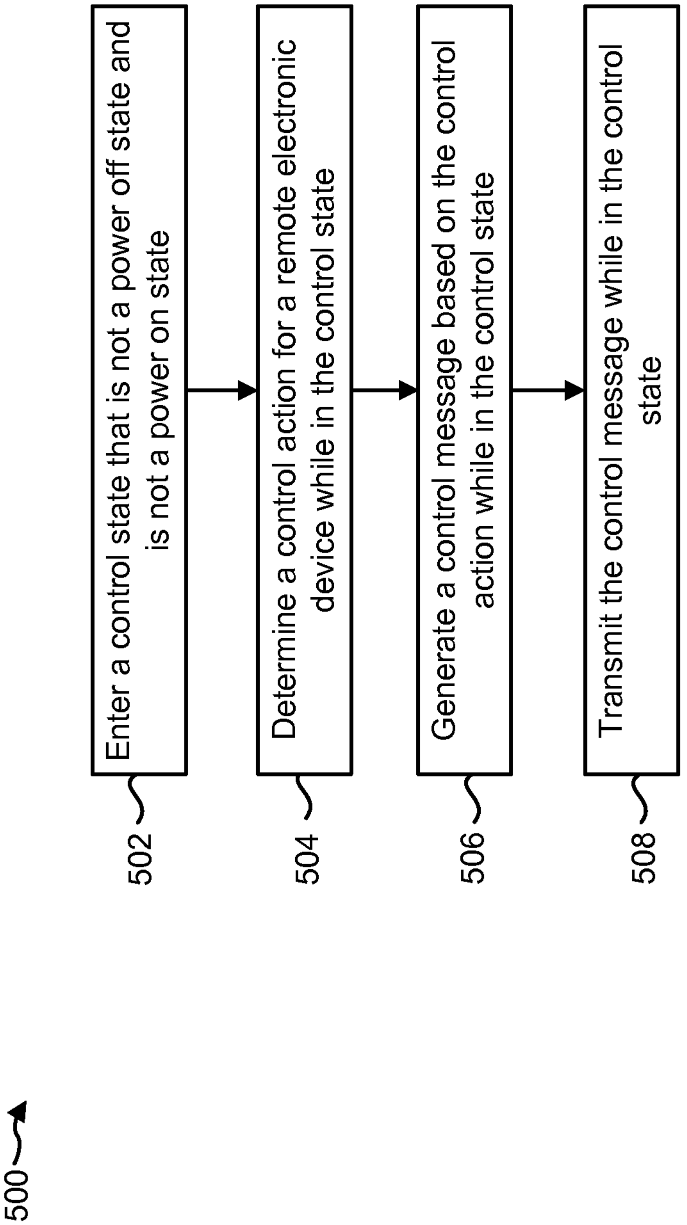
FIG. 5 is a flow diagram illustrating one configuration of a method for controlling a remote electronic device in a control state.

FIG. 5 is a flow diagram illustrating one configuration of a method 500 for controlling a remote electronic device 230 in a control state 104. An electronic device 208 may enter 502 a control state 104 that is not a power off state 102 and is not a power on state 106. For example, an electronic device 208 may enter 502 a control state 104 that is not a power off or standby state 102 and is not a power on state 106. For instance, the electronic device 208 may transition from a power off state or standby state 102 to the control state 104 or may transition from a power on state 106 to the control state 104.

The control state 104 may be different from the power off or standby state 102 and may be different from the power on state 106. For example, the electronic device 208 may function differently in a control state 104 than in a power on state 106, since it may use fewer components and/or may supply less power than is used in the power on state 106 (e.g., it may not use one or more main function block(s)/module(s) 274). Furthermore, the electronic device 208 may not perform a main function when in a control state 104. For example, a television may not output a display and/or receive media signals for display when in a control state 104.

The control state 104 may be different than the power off or standby state 102 since it may perform different functions, use different components, use components differently and/or supply a different amount of power or presence to components when in a control state 104 than when in a power off or standby state 102. For example, a television in the power off or standby state 102 may only provide power to an IR receiver and reduced processor presence in order to receive an IR signal to activate the television (e.g., transition to a power on state 106). However, the television may provide comparatively more processor presence for making remote electronic device 230 control action determinations, generating control messages 228 and/or sending control messages 228 to remote electronic devices 230 when in a control state 104. Furthermore, the television may maintain activity from components such as a network interface and/or communications interface, which may not occur in the power off of standby state 102.

While in the control state 104, the electronic device 208 may also make remote electronic device 230 control action determinations, generate control messages 228 and/or send control messages 228 to certain remote electronic devices 230, which it 208 may not do while in a power off or standby state 102. In some configurations, the electronic device 208 may only use components and perform procedures that are related to controlling one or more remote electronic devices 230 (in addition to providing state transition functionality, for example) while in the control state 104.

The electronic device 208 may determine 504 a control action for a remote electronic device 230 while in the control state 104. For example, the electronic device 208 may determine 504 a control action for a remote electronic device 230 based on control functions 214, settings 276 and/or messages received from the remote electronic device 230. For instance, one automation function 218 and/or resource management function 216 for an outdoor lighting system (a remote electronic device 230) may dictate that outdoor lights should be turned on at a certain time unless all of the remote electronic devices 230 are consuming more electrical power than a threshold. Thus, the electronic device 208 may receive messages from the remote electronic devices 230 indicating the amount of power they are currently consuming. If the remote electronic devices 230 are consuming less power than the threshold and the established time has been reached, then the electronic device 208 may determine 504 that the control action for the outdoor lighting system should be to turn the outdoor lights on. Otherwise, the electronic device 208 may determine that no control action should be taken or that the outdoor lights should be turned off.

The electronic device 208 may generate 506 a control message 228 while in the control state 104. The control message 228 may be generated 506 based on remote electronic device information 278 (e.g., control function(s) 214, setting(s) 276 and/or communication information 268) and or the control action described above. Continuing with the above example, if the electronic device 208 determines 504 that the outdoor lights should be turned on, the electronic device 208 may generate 506 a control message 228 for the outdoor lighting system (e.g., a remote electronic device 230) indicating that the outdoor lights should be turned on. In some configurations, generating 506 a control message 228 may also be based on communication information 268. For instance, the electronic device 208 may generate 506 the control message 228 based on a protocol, message format and/or encoding provided by the communication information 268.

The electronic device 208 may transmit 508 the control message (for controlling a remote electronic device 230, for example) while in the control state 104. For example, the electronic device 208 may send a control message 228 to one or more remote electronic devices 230. The control message 228 may be sent over a wireless link, a network (wired and/or wireless) connection or a wired connection. Continuing with the above example, the electronic device 208 may send the message 228 generated 506 to the outdoor lighting system. It should be noted that the electronic device 208 may also receive messages from one or more remote electronic devices 230 while in a control state 104. Transmitting 508 the control message 228 may allow the electronic device 208 to control the remote electronic device 230 while in the control state 104. For example, the control message 228 sent to the remote electronic device 230 may provide an instruction to control the remote electronic device 230 according to the control functions 214 on the electronic device 208. The electronic device 208 may additionally or alternatively control the remote electronic device 230 by performing or repeating the forgoing procedure by determining 504 a control action, generating 506 a control message 228 and/or transmitting 508 the control message to the remote electronic device 230.

Figure 6:
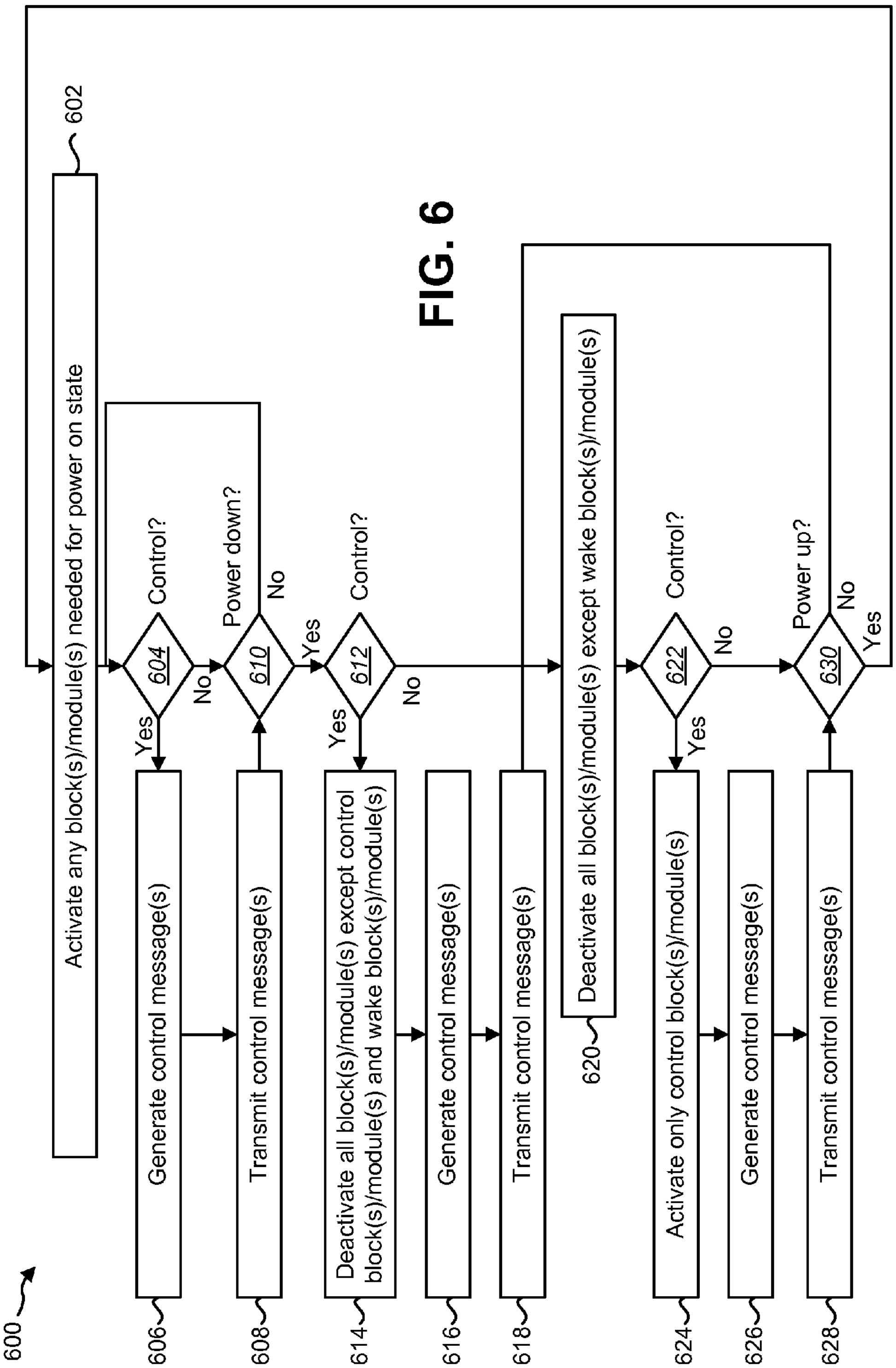
FIG. 6 is a flow diagram illustrating a more specific configuration of a method for controlling a remote electronic device in a control state.

FIG. 6 is a flow diagram illustrating a more specific configuration of a method 600 for controlling a remote electronic device 230 in a control state 104. The electronic device 208 may activate 602 any block(s)/module(s) needed for a power on state 106. For example, the electronic device 208 may activate 602 the main function block(s)/module(s) 274 to enable the electronic device 208 to perform its main function. For instance, a television may activate 602 a display and video processing in order to display media.

The electronic device 208 may determine 604 whether to control a remote electronic device 230. For example, the electronic device 208 may determine 604 whether any control of a remote electronic device 230 is required based on control functions 214, settings 276 and/or any messages received from the remote electronic device 230. For instance, the electronic device 208 may determine 604 whether a scheduled control action has been triggered (based on a current time, for example), whether a threshold has been met, etc.

If the electronic device 208 determines 604 not to control a remote electronic device 230, the electronic device 208 may determine 610 whether to power down (e.g., transition to a power off or standby state 102). If the electronic device 208 determines 604 to control a remote electronic device 230, the electronic device 208 may generate 606 one or more control messages 228. For example, the electronic device 208 may determine a control action and then generate 606 a control message 228 based on that control action. As described above, the control message 228 may be generated 606 based on communication information 268 in some configurations. The electronic device 208 may then transmit 608 the one or more control messages 228. For example, the electronic device 208 may transmit 608 the control message(s) 228 using a wired and/or wireless connection. Additionally or alternatively, the control message(s) 228 may be transmitted 608 directly to one or more remote electronic devices 230 and/or may be transmitted 608 to one or more remote electronic devices 230 over a network.

The electronic device 208 may determine 610 whether to power down (e.g., transition to a power off or standby state 102). For example, the electronic device 208 may determine whether a power down command was received or whether some other event (e.g., a sleep timer) triggers power down. For instance, a television may receive a power down command from a remote control. If the electronic device 208 determines 610 not to power down, the electronic device 208 may return to determining 604 whether to control a remote electronic device 230.

If the electronic device 208 determines 610 to power down, the electronic device 208 may determine 612 whether to control a remote electronic device 230. For example, the electronic device 208 may determine 612 whether any control of a remote electronic device 230 is required based on control functions 214, settings 276 and/or any messages received from the remote electronic device 230. For instance, the electronic device 208 may determine whether to transition to the control state 104. If the electronic device 208 determines 612 not to control a remote electronic device 230, the electronic device 208 may deactivate 620 all block(s)/module(s) except wake block(s)/module(s).

If the electronic device 208 determines 612 to control a remote electronic device 230, the electronic device 208 may deactivate 614 all block(s)/module(s) except control block(s)/module(s) 270 and wake block(s)/module(s) 264. For example, the electronic device 208 may discontinue performing any operations that are unrelated to controlling a remote electronic device 230 and state transitioning. For instance, the electronic device 208 may deactivate 614 main function block(s)/module(s) 274. In some configurations, the electronic device 208 may not operate any hardware blocks and/or software modules that are unrelated to controlling a remote electronic device 230 (and state transitioning, for example).

The electronic device 208 may generate 616 one or more control messages 228. For example, the electronic device 208 may determine a control action and then generate 616 a control message 228 based on that control action. As described above, the control message 228 may be generated 616 based on communication information 268 in some configurations. The electronic device 208 may then transmit 618 the one or more control messages 228. For example, the electronic device 208 may transmit 618 the control message(s) 228 using a wired and/or wireless connection. Additionally or alternatively, the control message(s) 228 may be transmitted 618 directly to one or more remote electronic devices 230 and/or may be transmitted 618 to one or more remote electronic devices 230 over a network.

The electronic device 208 may deactivate 620 all block(s)/module(s) except wake block(s)/module(s) 264. For example, the electronic device 208 may discontinue performing any operations that are unrelated to state transitioning. For instance, the electronic device 208 may deactivate 620 main function block(s)/module(s) 274 and control block(s)/module(s) 270. In some configurations, the electronic device 208 may not operate any hardware blocks and/or software modules that are unrelated to state transitioning.

The electronic device 208 may determine 622 whether to control a remote electronic device 230. For example, the wake block(s)/module(s) 264 may determine whether to transition to a control state 104. In some configurations, the electronic device 208 may make this determination 622 based on a schedule. For instance, the electronic device 208 may transition periodically to the control state 104 from the power off or standby state 102 to ascertain whether controlling a remote electronic device 230 is prescribed. Additionally or alternatively, the state transitioning may be based on information (e.g., triggers) provided to the wake block(s)/module(s) 264 from the control block(s)/module(s) 270 while in the control state 104 or power on state 106 in some configurations. For example, the control block(s)/module(s) 270 may provide a schedule for the wake block(s)/module(s) 264 to transition to the control state 104 for when the electronic device 208 is in a power off or standby state 102. This may be done to ensure that the control block(s)/module(s) 270 may be activated to control the remote electronic device(s) 230 according to the control functions 214 and/or settings 276 when indicated. Additionally or alternatively, the information (e.g., triggers) provided to the wake block(s)/module(s) 264 may allow a remote electronic device 230 to trigger a state transition to the control state 104 by signaling the electronic device 208. If the electronic device 208 determines 622 not to control a remote electronic device 230, the electronic device 208 may determine 630 whether to power up (e.g., transition to a power on state 106).

If the electronic device 208 determines 622 to control a remote electronic device 230, the electronic device 208 may activate 624 only control block(s)/module(s) 270. It should be noted that the wake block(s)/module(s) 264 may be maintained active at this point. For example, the electronic device 208 may transition to the control state 104. This may be done by starting to perform operations that are related to controlling a remote electronic device 230. In some configurations, the electronic device 208 may operate only hardware blocks and/or software modules that are related to controlling a remote electronic device 230 (and state transitioning, for example) while in the control state 104.

The electronic device 208 may generate 626 one or more control messages 228. For example, the electronic device 208 may determine a control action and then generate 626 a control message 228 based on that control action. As described above, the control message 228 may be generated 626 based on communication information 268 in some configurations. The electronic device 208 may then transmit 628 the one or more control messages 228. For example, the electronic device 208 may transmit 628 the control message(s) 228 using a wired and/or wireless connection. Additionally or alternatively, the control message(s) 228 may be transmitted 628 directly to one or more remote electronic devices 230 and/or may be transmitted 628 to one or more remote electronic devices 230 over a network.

The electronic device 208 may determine 630 whether to power up. For example, the wake block(s)/module(s) 264 may determine whether a power up command has been received. For instance, an IR receiver may determine that an IR signal is received that commands the electronic device 208 (e.g., television) to transition to a power on state 106. In other examples, the electronic device 208 may determine 630 to power up based on the use of a power button, switch, Bluetooth signal, radio frequency (RF) signal, network message, etc.

If the electronic device 208 determines 630 not to power up, the electronic device 208 may deactivate 620 all block(s)/module(s) except wake block(s)/module(s) 264 as described above. If the electronic device 208 determines 630 to power up, the electronic device 208 may activate 602 any block(s)/module(s) needed for the power on state 106 as described above.

Figure 7:
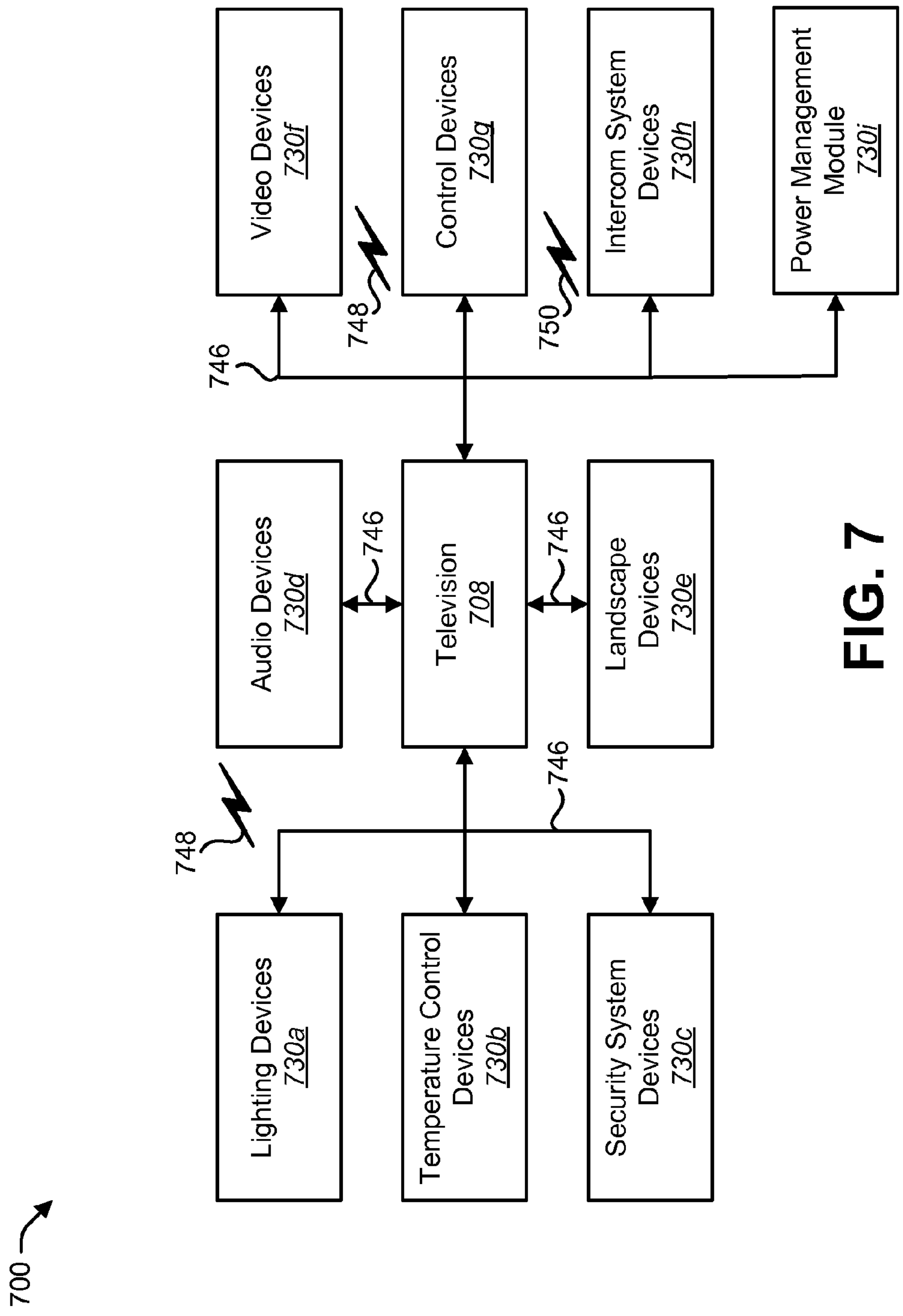
FIG. 7 is a block diagram illustrating one example of a television and several remote electronic devices.

FIG. 7 is a block diagram illustrating one example 700 of a television 708 and several remote electronic devices 730. The television 708 may be in electronic communication with the remote electronic devices 730. The television 708 may be connected to the remote electronic devices 730 via wireless or wired connections. In this example 700, the television 708 may be connected to the remote electronic devices 730 via an Ethernet connection 746, a WiFi connection 750, a ZigBee connection 748 or a combination of the three. The television 708 may be capable of communicating via these connections (e.g., Ethernet 746, Wi-Fi 750, ZigBee 748) and/or other types of connections.

In this example 700, the remote electronic devices 730 may include lighting devices 730*a*, temperature control devices 730*b*, security system devices 730*c*, audio devices 730*d*, landscape devices 730*e*, video devices 730*f*, control devices 730*g*, intercom system devices 730*h* and a power management module 730*i*. Lighting devices 730*a* may include light switches, dimmers, window blinds, etc. Temperature control devices 730*b* may include thermostats, air conditioners, heaters, furnaces, fans, fireplaces and the like. Security system devices 730*c* may include security cameras, motion detectors, door sensors, locks, window sensors, gates and/or other security devices. Audio devices 730*d* may include AM/FM radio receivers, XM radio receivers, CD players, MP3 players, cassette tape players, and/or other devices capable of producing an audio signal. Landscape devices 730*e* may include sprinkler system devices, drip system devices and/or other landscape related devices. Video devices 730*f* may include other televisions, monitors, projectors and/or other devices capable of processing video signals and/or displaying images. The control devices 730*g* may include touch screens, keypads, remote controls, in-home displays (IHDs) and/or other control devices 730*g* capable of communicating with and/or controlling other remote electronic device(s). Intercom system devices 730*h* may include intercom microphones, intercom-related video devices and/or other devices typically associated with an intercom system. The power management module 730*i* may include a control mechanism for the other remote electronic devices 730. In other words, the power management module 730*i* may include control functions that implement functionality for complying with requests for controlling (e.g., reducing) resource consumption, for example.

In this example 700, the television 708 may control one or more of the remote electronic devices 730 while in a control state 104. In some configurations, one or more (e.g., all) of the remote electronic devices 730 may be appliances. Additionally or alternatively, one or more (e.g., all) of the remote electronic devices 730 may be appliances and controllers included within, attached to and/or associated with a structure, such as a house or building.

Figure 8:
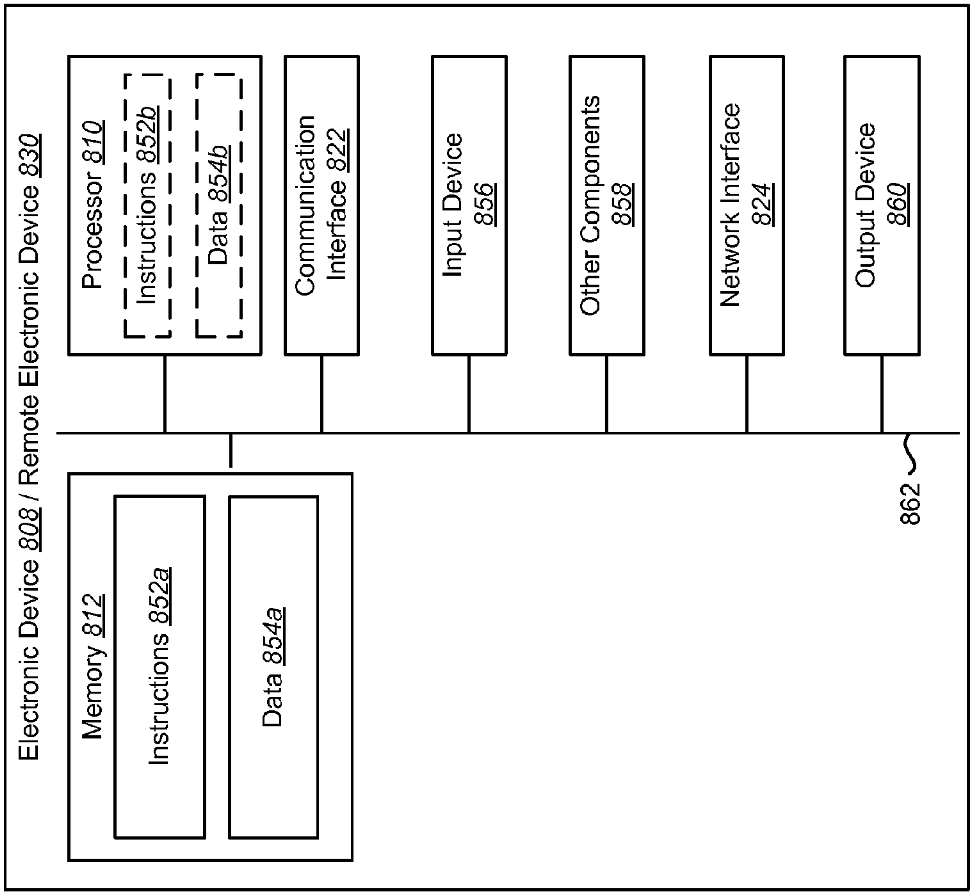
FIG. 8 is a block diagram illustrating various components that may be utilized in an electronic device and/or remote electronic device.

FIG. 8 is a block diagram illustrating various components that may be utilized in an electronic device 808 and/or remote electronic device 830. Although only the electronic device 808 and/or remote electronic device 830 are shown, the configurations herein may be implemented in a distributed system using many electronic devices. An electronic device 808 and/or remote electronic device 830 may include the broad range of digital computers, including microcontrollers, handheld computers, personal computers, servers, mainframes, supercomputers, minicomputers, workstations and any variation or related device thereof. In some configurations, the electronic device 808 and/or remote electronic device 830 may be appliances. Additionally or alternatively, the electronic device 808 and/or remote electronic device 830 may be an embedded device inside an otherwise complete device (e.g., within an appliance).

The electronic device 808 and/or remote electronic devices 830 is/are shown with a processor 810 and memory 812. The processor 810 may control the operation of the electronic device 808 and/or remote electronic device 830 and may be embodied as a microprocessor, a microcontroller, a digital signal processor (DSP) or other device known in the art. The processor 810 typically performs logical and arithmetic operations based on program instructions 852*a* and/or data 854*a* stored within the memory 812. The instructions 852*a* in the memory 812 may be executable to implement the methods described herein. FIG. 8 illustrates instructions 852*b* and/or data 854*b* being loaded onto the processor 810. The instructions 852*b* and/or data 854*b* may be the instructions 852*a* and/or data 854*a* (or portions thereof) stored in memory 812.

The electronic device 808 and/or remote electronic device 830 may also include one or more communication interfaces 822 and/or network interfaces 824 for communicating with other electronic devices. The communication interface(s) 822 and the network interface(s) 824 may be based on wired communication technology, and/or wireless communication technology, such as ZigBee®, WiMax®, WiFi®, Bluetooth® and/or cellular protocols, such as GSM®, etc.

The electronic device 808 and/or remote electronic device 830 may also include one or more input devices 856 and one or more output devices 860. The input devices 856 and output devices 860 may facilitate user input/user output. Other components 858 may also be provided as part of the electronic device 808 and/or remote electronic device 830.

Data 854*a* and instructions 852*a* may be stored in the memory 812. The processor 810 may load and execute instructions 852*b* from the instructions 852*a* in memory 812 to implement various functions. Executing the instructions 852*a* may involve the use of the data 854*a* that is stored in the memory 812. The instructions 852*b* and/or data 854*b* may be loaded onto the processor 810. The instructions 852 are executable to implement the one or more methods shown herein, and the data 854 may include one or more of the various pieces of data described herein.

The memory 812 may be any electronic component capable of storing electronic information. The memory 812 may be embodied as random access memory (RAM), read-only memory (ROM), magnetic disk storage media, optical storage media, flash memory devices in RAM, on-board memory included with the processor, EPROM memory, EEPROM memory, an ASIC (Application Specific Integrated Circuit), registers, and so forth, including combinations thereof. The various components of the electronic device 808 and/or remote electronic device 830 may be coupled together by a bus system 862, which may include a power bus, a control signal bus and a status signal bus, in addition to a data bus. However, for the sake of clarity, the various buses are illustrated in FIG. 8 as the bus system 862.

In the above description, reference numbers have sometimes been used in connection with various terms. Where a term is used in connection with a reference number, it may refer to a specific element that is shown in one or more of the Figures. Where a term is used without a reference number, it may refer generally to the term without limitation to any particular Figure.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may refer to a combination of processing devices e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable or processor-readable statement(s). For example, the terms "instructions" and "code" may refer to one or more programs, routines, sub-routines, functions, procedures, etc. "Instructions" and "code" may comprise a single computer-readable statement or many computer-readable statements.

The term "computer-readable medium" refers to any available medium that can be accessed by a computer or processor. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be tangible and non-transitory. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. An electronic device for controlling a remote electronic device, comprising:
- a processor;
- memory in electronic communication with the processor;
- instructions stored in the memory, the instructions being executable to:
  - enter a control state that is not a power off state and is not a power on state, wherein the control state is a reduced power state, wherein the electronic device does not perform a main function while in the control state, wherein the electronic device does not provide electrical power to a main function block but does provide electrical power to a control block while in the control state, wherein the power off state allows only powering on functionality, and wherein the electronic device does not provide electrical power to the control block while in the power off state;
  - determine a control action for a remote electronic device while in the control state;
  - generate a control message for the remote electronic device while in the control state; and
  - transmit the control message for controlling the remote electronic device while in the control state.

2. The electronic device of claim 1, wherein the electronic device is an appliance.

3. The electronic device of claim 1, wherein the electronic device is a television.

4. The electronic device of claim 1, wherein the remote electronic device is an appliance.

5. The electronic device of claim 1, wherein the control message is generated based on a control action.

6. The electronic device of claim 1, wherein the control message is generated based on remote electronic device information.

7. The electronic device of claim 1, wherein the electronic device only performs operations related to controlling the remote electronic device while in the control state.

8. A method for controlling a remote electronic device by an electronic device, comprising:
- entering a control state that is not a power off state and is not a power on state, wherein the control state is a reduced power state, wherein the electronic device does not perform a main function while in the control state, wherein the electronic device does not provide electrical power to a main function block but does provide electrical power to a control block while in the control state, wherein the power off state allows only powering on functionality, and wherein the electronic device does not provide electrical power to the control block while in the power off state;
- determine a control action for a remote electronic device while in the control state;
- generating a control message for the remote electronic device while in the control state; and
- transmitting the control message for controlling the remote electronic device while in the control state.

9. The method of claim 8, wherein the electronic device is an appliance.

10. The method of claim 8, wherein the electronic device is a television.

11. The method of claim 8, wherein the remote electronic device is an appliance.

12. The method of claim 8, wherein the control message is generated based on a control action.

13. The method of claim 8, wherein the control message is generated based on remote electronic device information.

14. The method of claim 8, wherein the electronic device only performs operations related to controlling the remote electronic device while in the control state.

15. A non-transitory tangible computer-readable medium for controlling a remote electronic device, comprising executable instructions for:
- entering a control state that is not a power off state and is not a power on state, wherein the control state is a reduced power state, wherein the electronic device does not perform a main function while in the control state, and wherein the electronic device does not provide electrical power to a main function block but does provide electrical power to a control block while in the control state, wherein the power off state allows only powering on functionality, and wherein the electronic device does not provide electrical power to the control block while in the power off state;

determining a control action for a remote electronic device while in the control state;

generating a control message for the remote electronic device while in the control state; and transmitting the control message for controlling the remote electronic device while in the control state.

* * * * *

UNITED STATES PATENT AND TRADEMARK OFFICE

CERTIFICATE OF CORRECTION

PATENT NO. : 9,123,237 B2
APPLICATION NO. : 13/196225
DATED : September 1, 2015
INVENTOR(S) : Wallace Eric Smith et al.

It is certified that error appears in the above-identified patent and that said Letters Patent is hereby corrected as shown below:

On the Title page, please delete the assignee "QUALCOMM Incorporated, San Diego, CA (US)" and replace it with --Control4 Corporation, Salt Lake City, UT (US)--.

Signed and Sealed this
Twenty-third Day of August, 2016

Michelle K. Lee
*Director of the United States Patent and Trademark Office*